United States Patent
Huber

(10) Patent No.: US 11,268,018 B2
(45) Date of Patent: Mar. 8, 2022

(54) METHOD FOR PREPARING A ZEOLITE L MATERIAL HOSTING AT LEAST ONE TYPE OF GUEST MOLECULE

(71) Applicant: MERZ+BENTELI AG, Niederwangen (CH)

(72) Inventor: Stefan Huber, Langenthal (CH)

(73) Assignee: MERZ+BENTELI AG, Niederwangen (CH)

( * ) Notice: Subject to any disclaimer, the term of this patent is extended or adjusted under 35 U.S.C. 154(b) by 107 days.

(21) Appl. No.: 16/634,536

(22) PCT Filed: Jul. 25, 2018

(86) PCT No.: PCT/CH2018/000033
§ 371 (c)(1),
(2) Date: Jan. 27, 2020

(87) PCT Pub. No.: WO2019/018951
PCT Pub. Date: Jan. 31, 2019

(65) Prior Publication Data
US 2021/0087461 A1 Mar. 25, 2021

(30) Foreign Application Priority Data
Jul. 26, 2017 (EP) .................................. 17183382

(51) Int. Cl.
*C09K 11/02* (2006.01)
*C01B 39/32* (2006.01)
*C09K 11/06* (2006.01)

(52) U.S. Cl.
CPC .............. *C09K 11/02* (2013.01); *C01B 39/32* (2013.01); *C09K 11/06* (2013.01); *C09K 2211/1018* (2013.01)

(58) Field of Classification Search
CPC . C09K 11/02; C09K 11/06; C09K 2211/1018; C01B 39/32
See application file for complete search history.

(56) References Cited

U.S. PATENT DOCUMENTS 3,169,942 A 2/1965 Pike

FOREIGN PATENT DOCUMENTS

| EP | 1 873 202 B1 | 2/2009 |
|---|---|---|
| WO | 02/36490 A1 | 5/2002 |
| WO | 2010/009560 A1 | 1/2010 |
| WO | 2013/087568 A1 | 6/2013 |

OTHER PUBLICATIONS

Cao et al., "Supramolecular Organization of Dye Molecules in Zeolite L Channels: Synthesis, Properties, and Composite Materials," Chemistry A European Journal, 2016, vol. 22, pp. 4046-4060.
Minkowski et al., "Förster-Type Energy Transfer along a Specified Axis," Angew. Chem. Int. Ed., 2005, vol. 44, pp. 5325-5329.
Devaux et al., "Efficient and Robust Host-Guest Antenna Composite for Light Harvesting," Chemistry of Materials, 2014, vol. 26, pp. 6878-6885.
Sep. 26, 2018 International Search Report issued in International Patent Application No. PCT/CH2018/000033.
Sep. 26, 2018 Written Opinion of the International Searching Authority issued in International Patent Application No. PCT/CH2018/000033.

*Primary Examiner* — C Melissa Koslow
(74) *Attorney, Agent, or Firm* — Oliff PLC

(57) ABSTRACT

A method for preparing a zeolite L host-guest material hosting at least one type of guest molecule including the steps of: a) obtaining a composition including at least one cyclic siloxane and a mixture of guest molecules and zeolite L crystals having straight through channels, and b) heating the composition obtained in step a) to at least 100° C. to incorporate the organic guest molecules in the channels of the zeolite L crystals.

16 Claims, 2 Drawing Sheets

METHOD FOR PREPARING A ZEOLITE L MATERIAL HOSTING AT LEAST ONE TYPE OF GUEST MOLECULE

The present invention relates to a method for preparing a zeolite L host-guest material hosting at least one type of guest molecule.

Zeolite L crystals having straight through channels can act as hosts for the supramolecular organization of Molecules, complexes, clusters and quantum-size particles. These properties can be used, for example, in the development of devices such as infrared plastic light-emitting diodes for use in telecommunications, dye nanostructured materials for optical data storage or for improvement of the chemical-physical properties of a polymer. For example, EP 1 873 202 discloses a transparent zeolite-polymer hybrid material comprising zeolite L crystals containing guest molecules dispersed in a polymer which can be used in optical devices.

Zeolite is a well-known catalyst for many chemical reactions. For example, U.S. Pat. No. 3,169,942 discloses a condensation reaction of a hydroxyl and/or alkoxy containing silicon composition which is catalyzed by a crystalline zeolitic molecular sieve.

Dye loaded zeolite L materials are known to be suitable for a wide variety of applications. WO 02/36490 discloses the use of dye loaded zeolite L material as luminescent dye pigments with extremely high brilliance and stability, as scintillation material with extremely high sensitivity and versatility and as luminescent optical devices, such as dye lasers with dimensions of a few hundred nanometers, needles for scanning near field microscopes and other highly integrated optical devices.

Because of the higher stability of fluorescent dyes in the channels of zeolite L compared to the dye itself in solution or in a plastic composite, dye loaded zeolite L pigment and dye loaded zeolite L antenna systems are well suited as pigments in luminescence concentrators or luminescence dispersers as described in WO2010/009560.

However, it is rather difficult to find suitable loading conditions since the channels of the zeolite L should preferably contain only the guest molecules during the insertion process and no further molecules. In particular, the presence of oxygen, water and organic solvents, such as ethanol or methanol, can lead to the decomposition of organic dyes at high temperature during the insertion process. Furthermore, organic, solvents such as methanol and ethanol occupy a large amount of space within the channel and therefore prevent the dyes from entering into the channels of the zeolite L.

In particular, large organic dye molecules, which are of great commercial interest, are very difficult to be inserted into the cavities of zeolite L. Pengpeng Cao et al. disclose in Chem. Eur. J. 2016, 22, 4046-4060, "supramolecular organization of dye molecules in zeolite L channels: synthesis, properties and composite materials", a method for preparing such dye loaded zeolites. According to this method, the dyes are inserted into the zeolite channels through absorption in an evacuated and heated ampoule. Dye insertion takes place under vacuum at temperatures between 180° C. and 260° C. with time periods ranging from 24 h to 72 h, depending on the dye molecules and desired loading. However, due to the use of ampoules only a few hundred mg of the product can be obtained. Further, the insertion time is very long and the insertion efficiency is low, which increases the production costs further.

Therefore, it is a problem of the present invention to provide a method which allows a fast and effective production of zeolite L crystals hosting at least one type of guest molecule in a large scale.

The problem is solved by the method and preferred embodiments described herein.

Surprisingly, it was found that zeolite L host-guest material hosting at least one type of guest molecule can be produced in a very efficient, fast and inexpensive way. The method according to the present invention includes the following steps:

a) obtaining a composition comprising at least one cyclic siloxane and a mixture of at least one type of guest molecule and zeolite L crystals having straight through channels, b) heating the composition obtained in step a) to at least 100° C. to incorporate the guest molecules in the channels of the zeolite L crystals.

It has been found that cyclic siloxanes can dissolve at least partly the at least one type of guest molecules at the insertion temperature but at the same time is not able to enter into the channels of the zeolite L crystals. The cyclic siloxane that is present in a liquid state, transports the at least partly solubilized guest molecule to the opening of the zeolite L channels which then absorb the guest molecule. Due to the presence of the cyclic siloxane, which can at least partly dissolve the guest molecule at the insertion temperature, the complicated and time-consuming gas phase absorption process in a glass ampoule can be avoided.

In the present invention, zeolite L crystals are understood as aluminosilicates having parallel channels and/or cavities inside the crystal and a crystal length of 20 to 7000 nm, preferably 30 to 3000 nm. Zeolite L is preferably a cylindrically shaped, porous aluminosilicates. Preferably, dependent on the diameter of the crystals it comprises from hundreds to hundreds of thousands of strictly parallel channels. The zeolite L channels look like a pile of tires (FIGS. 1a and 1b). The diameter of the channel opening is about 0.7 nm and the largest free diameter is about 1.3 nm, making zeolite L an ideal host material for the supramolecular organisation of guest molecules, in particular of organic dyes. Zeolite L is commercially available, for example, under the name HSZ-500KOA from TOSOH Corporation.

Furthermore, zeolite L crystals may be easily prepared following the synthesis disclosed in Pengpeng Cao et al., Chem. Eur. J. 2016, 22, 4046-4060, "supramolecular organization of dye molecules in zeolite L channels: synthesis, properties and composite materials", in particular pages 64 and 65, "SI1.4 Synthesis and Post-Synthetic Treatment of ZL (Zeolite L, LTL Type)".

Preferably, the cyclic siloxane is a compound of the formula I

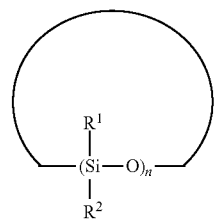

wherein $R^1$ and $R^2$ are, independently from each other, hydrogen, linear or branched substituted or unsubstitued $C_1$ to $C_8$ alkyl residues, substituted or unsubstitued $C_2$ to $C_8$ alkene residues, substituted or unsubstitued $C_2$ to $C_8$ alkyne residues, substituted or unsubstitued $C_5$ to $C_{10}$ cycloalkyl residues, substituted or unsubstitued $C_5$ to $C_{10}$ aryl, which may optionally contain at least one heteroatom like O, N, S, Si, and n is a whole integer from 3 to about 20, preferably 4 to 10. The residues may be unsubstituted or substituted by halogens, by fluorine, chlorine. Preferably, $R^1$ and $R^2$ are independently from each other methyl, ethyl, fluoropropyl or phenyl. Most preferably, $R^1$ and $R^2$ are methyl or phenyl.

Alternatively, the cyclic siloxane may be also a compound of the formula II

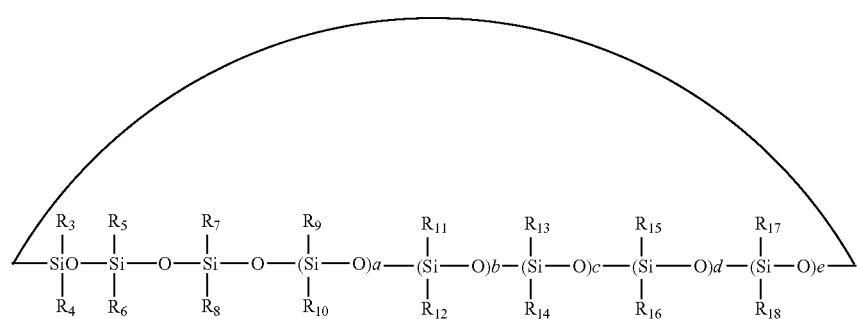

(II)

wherein $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, and $R^{18}$ are, independently from each other, hydrogen, linear or branched substituted or unsubstitued $C_1$ to $C_8$ alkyl residues, substituted or unsubstitued $C_2$ to $C_8$ alkene residues, substituted or unsubstitued $C_2$ to $C_8$ alkyne residues, substituted or unsubstitued $C_5$ to $C_{10}$ cycloalkyl residues, substituted or unsubstitued $C_5$ to $C_{10}$ aryl, which may contain at least one heteroatom like O, N, S, Si, and a, b, c, d and e are 0 or 1, and at least one of $R^3$, $R^5$, $R^7$, $R^9$, $R^{11}$, $R^{13}$, $R^{15}$ and $R^{17}$ and/or at least one of $R^4$, $R^6$, $R^8$, $R^{10}$, $R^{12}$, $R^{14}$, $R^{16}$ and $R^{18}$ are different from each other.

For example, in such a cyclic siloxane $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, and $R^{18}$ may all be methyl, $R^3$ may be phenyl and a, b, c, d and e may be all 1.

Preferably, the cyclic siloxane is a compound of formula I. Most preferably it is selected from the group consisting of 1,3,5-trimethylcyclotrisiloxane, 1,3,5-triethylcyclotrisiloxane, 1,3,5-trivinylcyclotrisiloxane, 1,3,5-triphenylcyclotrisiloxane, hexamethylcyclotrisiloxane, hexaethylcyclotrisiloxane, hexavinylcyclotrisiloxane, hexaphenylcyclotrisiloxane, 1,3,5-trivinyl-1,3,5-trimethylcyclotrisiloxane, 1,3,5-tri-methyl-1,3,5-triphenylcyclotrisiloxane, 1,3,5-tris(3,3,3-trifluoropropyl)-1,3,5-trimethylcyclotrisiloxane, 1,3,5,7-tetramethylcyclotetrasiloxane, 1,3,5,7-tetraethylcyclotetrasiloxane, 1,3,5,7-tetravinylcyclotetrasiloxane, 1,3,5,7-tetraphenylcyclotetrasiloxane, octamethylcyclotetrasiloxane, octaethylcyclotetrasiloxane, octavinylcyclotetrasiloxane, octaphenylcyclotetrasiloxane, 1,3,5,7-tetravinyl-1,3,5,7-tetramethylcyclotetrasiloxane, 1,3,5,7-tetramethyl-1,3,5,7-tetraphenylcyclotetrasiloxane, 1,3,5,7-tetrakis(3,3,3-trifluoropropyl)-1,3,5,7-tetramethylcyclotetrasiloxane, 1,3,5,7,9-pentamethylcyclopentasiloxane, 1,3,5,7,9-pentaethylcyclopentasiloxane, 1,3,5,7,9-pentavinylcyclopentasiloxane, 1,3,5,7,9-pentaphenylcyclopentasiloxane, decamethylcyclopentasiloxane, decaphenylcyclopentasiloxane, 1,3,5,7,9-pentavinyl-1,3,5,7,9-pentamethylcyclopentasiloxane, 1,3,5,7,9-pentamethyl-1,3,5,7,9-pentaphenylcyclopentasiloxane, 1,3,5,7,9,11-hexamethylcyclohexasiloxane, 1,3,5,7,9,11-hexavinylcyclohexasiloxane, 1,3,5,7,9,11-hexaphenylcyclohexasiloxane, dodecamethylcyclohexasiloxane, dodecavinylcyclohexasiloxane and dodecaphenylcyclohexasiloxane or mixtures thereof. Most preferably, the cyclic siloxane is octaphenylcyclotetrasiloxane, decamethylcyclopentasiloxane and dodecamethylcyclohexasiloxane or a mixture thereof.

The at least one type of guest molecule can be any kind of uncharged or charged, organic or inorganic molecule which has to be hosted in the cavities of zeolite L, such as dyes or medicaments. Preferably, the guest molecule is an uncharged organic guest molecule. It may be natural (for example from plant sources) or synthetic. Geometrical constraints of the zeolite L crystal lead to supramolecular organization of the guest molecules in the channels. Preferably, the guest molecules have a size that they can enter the channels of zeolite L but they cannot overlap or form dimers inside the channels. Of particular interest are dyes, preferably fluorescent dyes. The loading of the channels with the fluorescent dyes allows the creation of strongly luminescent materials. Due to the geometrical constraints, very high concentrations of monomeric fluorescent dye molecules can be realized. The short distances between them lead to fast radiationless Förster type energy migration where the excitation energy is directly transferred from molecule to molecule. This phenomenon is known to those skilled in the art (Förster-Type Energy Transfer along a Specified Axis, Claudia. Minkowski and Gion Calzaferri, Angew. Chem. Int. Ed. 2005, 44, 5325-5329). Further preferred guest molecules are UV absorbers, preferably selected from the group consisting of benzophenones, oxalanilides, benzotriazoles and triazines.

Preferably, the fluorescent dye is selected from the group consisting of perylene diimide dyes, terrylene diimide dyes, quaterrylene diimide dyes, biphenyls, terphenyls, quaterphenyls, tetracenes, perylenes, triphendioxazines, acridines, stilbenes, azobenzenes, oxazolyl benzenes, styryl benzenes, fluorenone, isoviolanthrones, H-anthra(2,1,9-mna)thioxanthen-on (C.I. Solvent Orange 63), 1H-thioxantheno2,1,9-defisoquinoline-1,3(2H)-dione (C.I. Solvent Yellow 98), 36-amino-2-(2,4-dimethylphenyl)-1H-benz[de]isoquinoline-1,3(2H)-dione (C.I. Solvent Yellow 44), diisobutyl perylene-3,9-dicarboxylate, diisobutyl 3,9-perylenedicarboxylate (C.I. Solvent Green 5), thioindigo compounds, 14H-anthra[2,1,9-mna]thioxanthen-14-one (Hostasol Red GG), 1,4-Bis(4-methyl-5-phenyl-2-oxazolyl)benzene (Dimethyl-POPOP), 1,4-Bis(5-phenyl-2-oxazolyl)benzene (POPOP), spiropyrans, naphthopyrans, carotenoids, carotenes, xanthenophylles, flavines, pyronines, oxazines, thionines, resorufine, squaraine dyes, boron-dipyrromethene dyes (BODIPY-dyes), methylviologen and carbocyanines. Especially preferred are perylene diimide based fluorescent dyes and terrylene diimide dyes, quaterrylene diimide dyes and thioxanthene benzanthrone dyes.

Examples of such fluorescent perylene diimide dyes are mentioned in the list below:

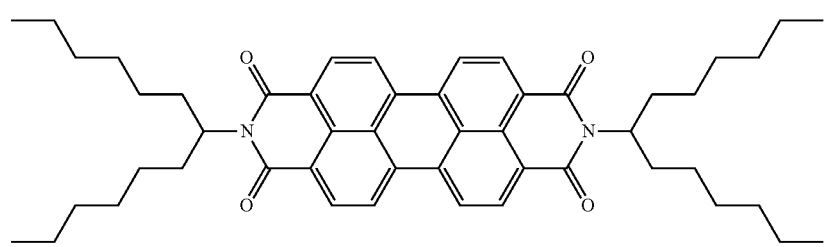

1

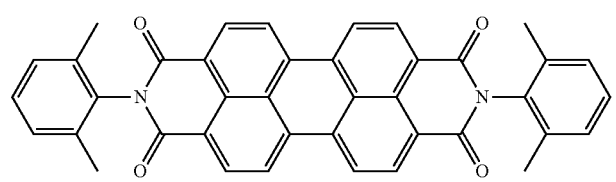

2

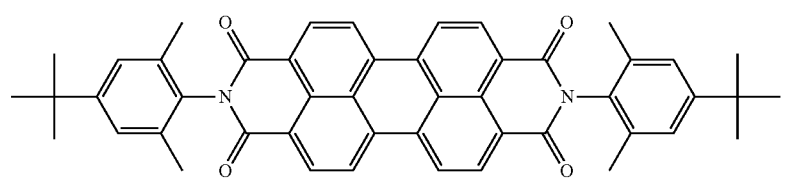

3

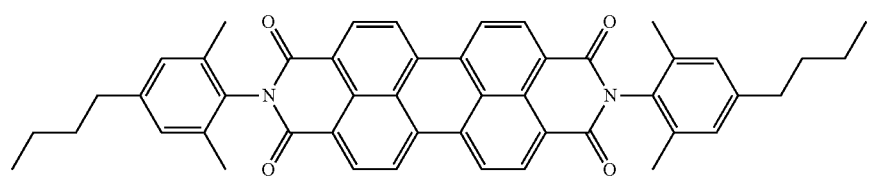

4

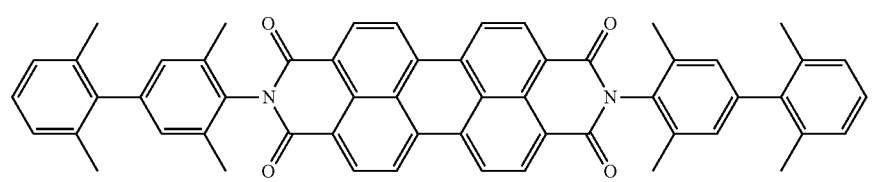

5

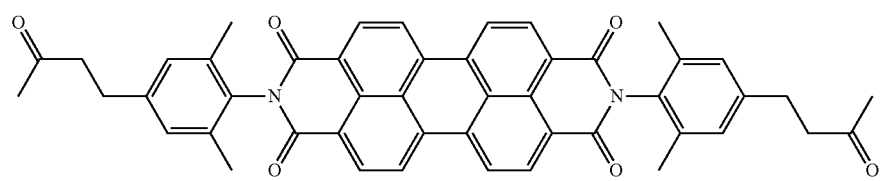

6

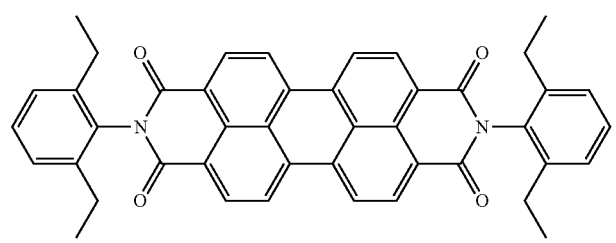

7

-continued
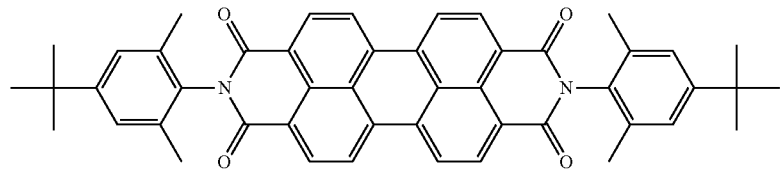
8
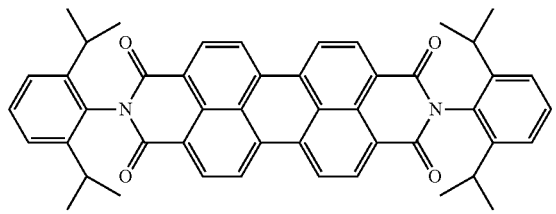
9
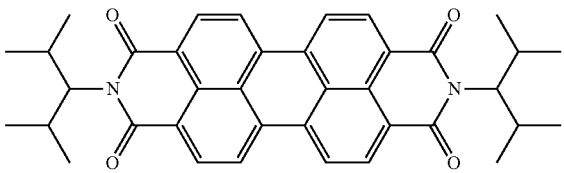
10
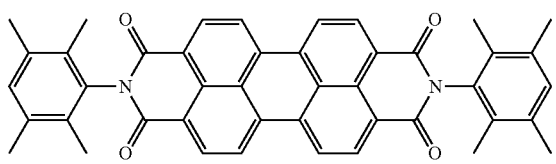
11
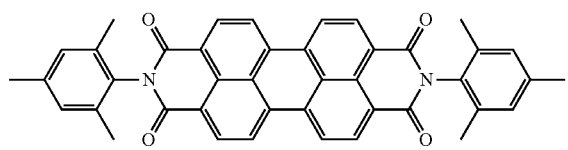
12
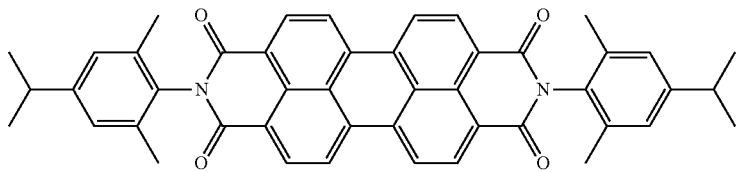
13
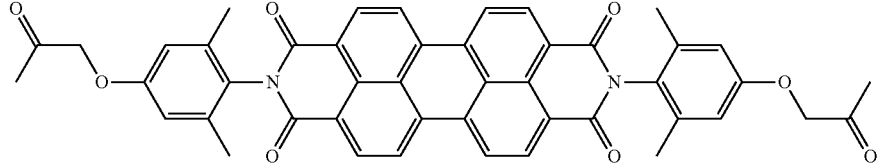
14
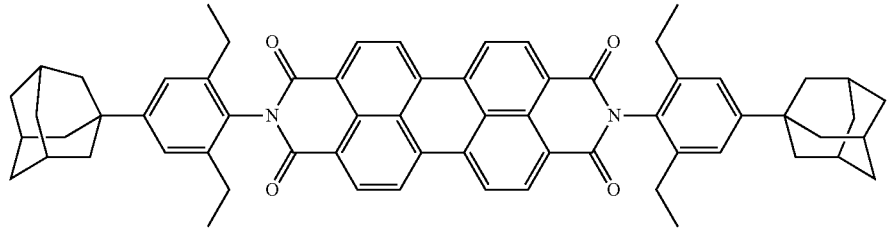
15
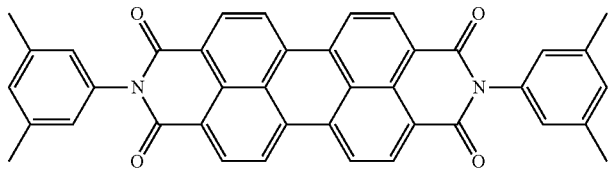
16
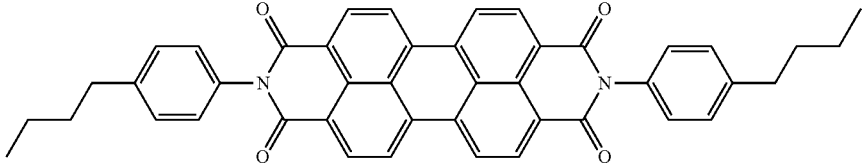
17

Some cyclic siloxanes are solid at room temperature. In case the cyclic siloxanes are solid at room temperature, the mixture in step b) of the method according to the present invention has to be heated to or, preferably above the melting temperature of the cyclic siloxane in order to make sure that the cyclic siloxane can act as transport agent. The term transport agent within the context of the present invention means that the transport agent can dissolve at least a small part, preferably at least 2% by weight, of the guest molecules at the insertion temperature and transport it to the channel opening of the zeolite L crystal, where the guest molecule is absorbed inside the channels.

The temperature used in step b) is depending on the insertion temperature of the guest molecules into the host, and if the cyclic siloxane is solid at room temperature on the melting temperature of the cyclic siloxane. The insertion temperature is preferably more than 150° C., most preferably between 150° C. and 350° C., and ideally between 200° C. and 250° C. These temperatures allow to solubilize part of the guest molecules better in the cyclic siloxanes and to induce vibrational deformations of the host and guest materials and therefore facilitates the loading of the guest molecules in the zeolite L channels.

Preferably, the incorporation of the guest molecules in the channels of the zeolite L crystals takes place in about 1 to 5 hours. During the incorporation process the mixture is preferably stirred. The temperature is preferably kept at the necessary insertion temperature. Preferably, the incorporation process in step b) is done under vacuum or an inert gas like nitrogen, argon or the like.

Preferably, after finalizing the loading of the guest molecules in the crystal channels, the composition comprising the zeolite L host-guest material with the incorporated guest molecules is cooled and washed to remove guest molecules which are adsorbed on the outer surface of the zeolite L crystals. Guest molecules on the surface of the crystals are not oriented, can form dimers and can therefore negatively influence the chemical-physical properties of the zeolite L host-guest material.

As a starting material for the method according to the present invention, a mixture of the guest molecule and the zeolite L crystal has to be provided. Preferably, the guest molecule is adsorbed on the outer surface of the zeolite L crystal. This can be obtained for example
  i. dissolving the guest molecules in a solvent,
  ii. mixing the zeolite L crystals and the solvent comprising the guest molecules and
  iii. drying the mixture obtained in step ii), preferably under vacuum, to receiving a dry, solvent- and oxygen-free mixture of the zeolite L crystals and the guest molecules.

This procedure results in zeolite L crystals, wherein the outer surface of the crystals is approximately homogenous covered by the guest molecules. Such crystals comprising the guest molecules on its outer surface is a preferred starting material for the method according to the present invention.

It is also possible to load more than one type of guest molecules in the zeolite L crystal by the method according to the present invention. In particular, it is possible, to create a so-called antenna system by loading, in a first step, a first type of fluorescent dye, and, in a second step, a second type of fluorescent dye. Preferably, these two types of fluorescent dyes are precisely tuned to each other, which means that the second fluorescent dye is able to accept excitation energy from the first fluorescent dye inside the channel, but cannot pass it back. The second fluorescent dye can re-emit this energy as fluorescence from the crystal surface, from the interior or exterior of the channel entrances or from the inside of the channels, or, in a more advanced setup, transfer it radiationlessly to a photoelectronic or a photochemical device. Such a "receiving antenna" can alternatively be turned into a "transmitter" if the positions of the two fluorescent dyes are reversed. In this case, the second fluorescent dye captures energy from the outside and transfers it to the molecules located inside the crystals. The principle of such systems is described in detail in WO 2010/009560.

Preferably, a zeolite L host-guest material hosting at least two types of different guest molecules is prepared by a method including the following steps:
a) obtaining a composition comprising at least one cyclic siloxane and a mixture of a first type of guest molecule and zeolite L crystals having straight through channels,
b) heating the composition obtained in step a) to at least 100° C. to incorporate the first type of guest molecules in the channels of the zeolite L crystals,
c) washing the zeolite host-guest material obtained in step b) hosting the first type of guest molecules,
d) providing a second type of guest molecule on the surface of the zeolite L crystals,
e) obtaining a composition comprising at least one cyclic siloxane and the zeolite L host-guest material comprising the second type of guest molecule on its surface as obtained in step d),
f) heating the composition obtained in step e) to at least 100° C. to incorporate the second type of guest molecules in the channels of the zeolite L crystals.

This procedure may be repeated as often as necessary.

Suitable solvents for the washing procedure are solvents in which the guest molecules are soluble. Such solvents are known to the skilled person.

Alternatively, two or more different types of guest molecule can be inserted as a mixture into the channels of zeolite L in one step.

The amount of guest molecules in the channels of zeolite L crystals can be described by the occupation probability p, as described in the literature (Efficient and Robust Host-Guest Antenna Composite for Light Harvesting, André Devaux, Gion Calzaferri, Peter Belser, Pengpeng Cao, Dominik Brühwiler, Andreas Kunzmann Chem. Mater., ACS, Chem. Mater. 2014, 26, 6878-6885). The value of p ranges from 0 for an empty zeolite L to 1 for a fully loaded one. An occupation probability p between 0 to about 0.5, in some cases up to 1 can be obtained by the method according to the present invention.

After preparation of the zeolite L host-guest material by the process according to the present invention, the loaded zeolite L host-guest material may be processed further as known in the art. For example, the surface of the loaded zeolite L crystals can be coated with a polymerizable silane, which can then be dispersed in a liquid monomer, followed by polymerizing the polymerizable silane and the liquid monomer to form a polymer wherein said zeolite L crystals are dispersed. Such a method is described in detail in EP 1 873 202.

The zeolite L host-guest material obtained by the method according to the present invention can be used for developing optical devices such as lenses, eye glasses., special mirrors, filters, polarizers, grids, optical storages, monitors, window panes, float glass, or for, coating of organic and inorganic surfaces for anti-reflection properties or light wavelength transformation, or for fluorescent or non-fluorescent pigments, luminescence concentrators or luminescence dispersers.

Using organic UV absorbers as guest molecules in the channels of zeolite L, preferably UV absorbers from the class of benzophenones, oxalanilides, benzotriazoles or triazines, a very stable UV absorbing host-guest material can be prepared. This kind of material can be used as UV stabilizing agent in plastics, adhesives, sealants or in cosmetics and personal care products like sun cream., The present invention relates also to the use of a cyclic siloxane as a transfer agent for the preparation of zeolite L crystals comprising guest molecules in their channels.

FIGURES

EXAMPLES

Figure 1A:
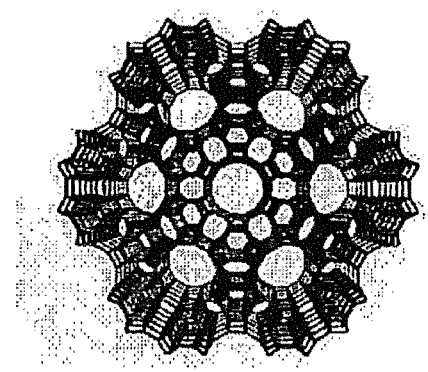
FIG. 1a shows a projection of the framework along the c-axis
Figure 1B:
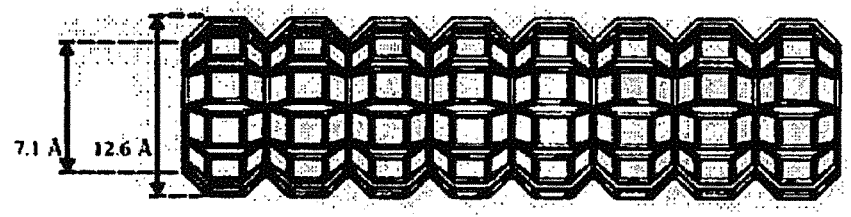
FIG. 1b shows a framework side view of a zeolite L crystal channel along the c-axis

Insertion of Neutral Molecules into the Channels of Zeolite L

Pre-Treatment of Zeolite L Crystals

Commercial zeolite L (HSZ-500KOA, TOSOH Corporation) was used for all the experiments (P. Cao, O. Khorev, A. Devaux, L. Sägesser, A. Kunzmann, A. Ecker, R. Häner, D. Brühwiler, G. Calzaferri, P. Belser, Chem. Eur. J. 2016, 22, 4046-4060). To ensure that the composition of charge compensating cations inside the zeolite L channel is well defined, 3 g of HSZ-500KOA zeolite L was suspended in 30 ml 0.5 M $KNO_3$ (Sigma-Aldrich) in deionized water and stirred at room temperature for 3 hours. The suspension was centrifuged and washed two times with deionized water; the supernatant was discharged. Amorphous impurities, which may be present in commercial zeolite L, was eliminated in the supernatants.

Some of the $K^+$ ions were further exchanged with 1-ethyl-3-methylimidazolium ($IMZ^+$) to control the pH inside the channels as some dyes inserted into the channels might be susceptible to acidic pH.

2 g of $K^+$ exchanged zeolite L HSZ-500KOA was suspended in 3.6 ml of 1-ethyl-3-methylimidazolium bromide solution (Sigma-Aldrich) (0.1 M in deionized water) and 20 ml of deionized water. The suspension was homogenized in an ultrasonic bath and stirred under reflux at 80° C. for 16 hours. Afterwards, the suspension was centrifuged, the supernatant was discharged and the $K^+$/$IMZ^+$—zeolite L was dried in an oven at 80° C. for 12 h.

Reference Example: insertion of Hostasol Red GG (HR, obtained from Clariant) (14H-anthra[2,1,9-mna]thioxanthen-14-one) and tb-DXP N,N'-Bis(4-tert-Butyl-2,6-dimethylphenyl)-3,4,9,10-perylenetetracarboxylic diimide (synthesized according to literature) into the channels of $K^+$/$IMZ^+$ zeolite L.

400 mg of $K^+$/$IMZ^+$ zeolite L was mixed with 0.95 mg of Hostasol Red GG and 7.5 mg of tb-DXP and crushed to a fine powder in an agate mortar. The powder was suspended in ethanol and homogenized in an ultrasonic bath. Ethanol was removed under reduced pressure and the powder was filled in a glass ampoule. The powder was dried in the ampoule for 16 hours at a pressure <0.1 mbar and the ampoule was sealed. The sealed ampoule was put in an oven and stored at 210° C. for 3 days. After cooling, the ampoule was opened, and the powder was washed several times with dichloromethane and centrifuged to remove molecules which were adsorbed on the outer surface of the zeolite L and not inside the channels. UV-VIS spectroscopy of the combined supernatants showed an insertion efficiency of 75-80% of Hostasol Red GG and tb-DXP into the channels of zeolite L.

EXAMPLE 1

800 mg of $K^+$/$IMZ^+$ zeolite L was mixed with 1.9 mg of Hostasol Red GG and 15 mg of tb-DXP and crushed to a fine powder in an agate mortar. The powder was suspended in ethanol and homogenized in an ultrasonic bath. Ethanol was removed under reduced pressure and the powder was put into a Schlenk flask equipped with a teflon valve. 5 g of octaphenylcyclotetrasiloxane (OPCTS) (from Alfa Aesar) was added and the Schlenk flask was evacuated to a pressure of <0.1 mbar and the mixture was dried for 2 h at 150°. The mixture was heated to the melting point of OPCTS and the teflon valve was closed. The mixture was stirred for 3 hours at 210° C. After cooling, the mixture was washed several times with dichloromethane and centrifuged to remove molecules which were adsorbed on the outer surface of the zeolite L and not inside the channels. UV-VIS spectroscopy of the combined supernatants showed an insertion efficiency of >98% of Hostasol Red GG and tb-DXP into the channels of zeolite L.

EXAMPLE 2

800 mg of $K^+$/$IMZ^+$ zeolite L was mixed with 1.9 mg of Hostasol Red GG and 15 mg of tb-DXP and crushed to a fine powder in an agate mortar. The powder was suspended in ethanol and homogenized in an ultrasonic bath. Ethanol was removed under reduced pressure and the powder was put into a Schlenk flask equipped with a teflon valve. The flask was evacuated to a pressure of <0.1 mbar and the powder was dried for 2 hours at 150° C., and after cooling the flask was flushed with nitrogen. 5 ml of decamethylcyclopentasiloxane (CM-50 from BRB International b.v.) was added under nitrogen atmosphere and the suspension was homogenized in an ultrasonic bath. The suspension was heated to 200° C. under nitrogen for 3 hours. After cooling, the mixture was washed several times with dichloromethane and centrifuged to remove molecules which were adsorbed on the outer surface of the zeolite L and not inside the channels. UV-VIS spectroscopy of the combined supernatants showed an insertion efficiency of 94% of Hostasol Red GG and tb-DXP into the channels of zeolite L.

Figure 2A:
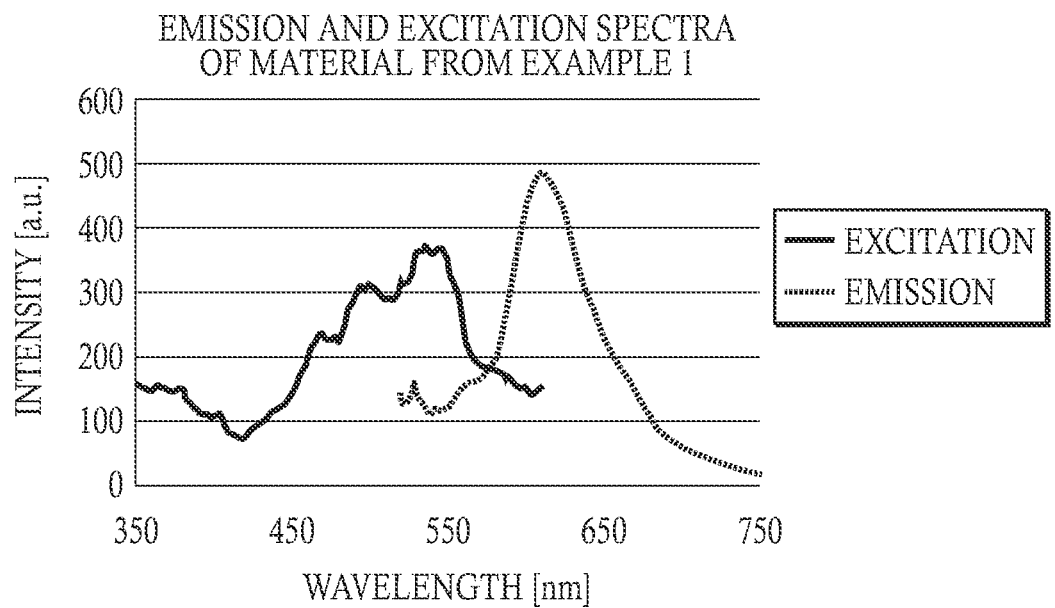
FIG. 2a shows fluorescence and excitation spectra of a zeolite L crystal according to the present invention
Figure 2B:
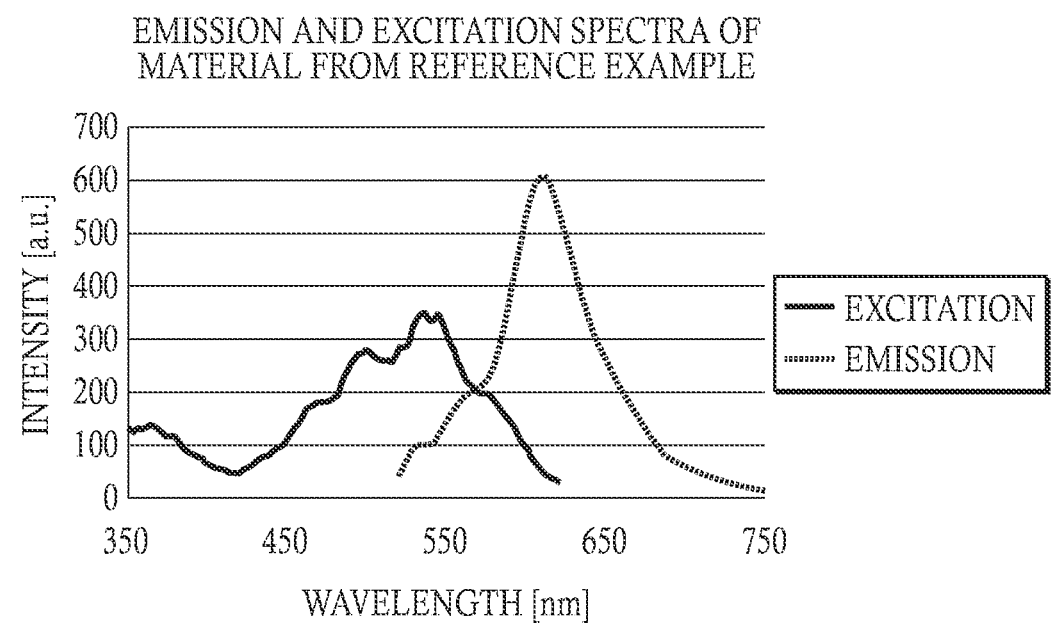
FIG. 2b shows fluorescence and excitation spectra of a reference sample

Successful insertion of both molecules into the channels of zeolite L was proven by fluorescence spectroscopy (FIGS. 2a and 2b). Due to alignment and the distances of the molecules in the channels, Förster type resonance energy transfer occurs between tb-DXP molecules and from tb-DXP to HR. Excitation measurements at the emission wavelength of HR (640 nm) and emission spectra with excitation of tb-DXP at 490 nm both show substantial amount of Förster type resonance energy transfer from tb-DXP to HR.

The invention claimed is:

1. A method for preparing a zeolite L material hosting at least one type of guest molecule including the steps of a) obtaining a composition comprising at least one cyclic siloxane and a mixture of the at least one type of guest molecule and zeolite L crystals having straight through channels, and
b) heating the composition obtained in step a) to at least 100° C. to incorporate the at least one type of guest molecule in the channels of the zeolite L crystals,
wherein the at least one cyclic siloxane acts as a transport agent for the at least one type of guest molecule.

2. The method according to claim 1, wherein the at least one cyclic siloxane is a compound of the formula I

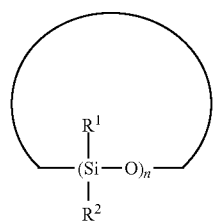

(I)

wherein $R^1$ and $R^2$ are, independently from each other, hydrogen, linear or branched substituted or unsubstituted $C_1$ to $C_8$ alkyl residues, substituted or unsubstituted $C_2$ to $C_8$ alkene residues, substituted or unsubstituted $C_2$ to $C_8$ alkyne residues, substituted or unsubstituted $C_5$ to $C_{10}$ cycloalkyl residues, substituted or unsubstituted $C_5$ to $C_{10}$ aryl, which may contain at least one heteroatom like O, N, S, Si, and n is a whole integer from 3 to about 20.

3. The method according to claim 2, wherein n is a whole integer from 4 to 10.

4. The method according to claim 1, wherein the cyclic siloxane is selected from the group consisting of 1,3,5-trimethylcyclotrisiloxane, 1,3,5-triethylcyclotrisiloxane, 1,3,5-trivinylcyclotrisiloxane, 1,3,5-triphenylcyclotrisiloxane, hexamethylcyclotrisiloxane, hexaethylcyclotrisiloxane, hexavinylcyclotrisiloxane, hexaphenylcyclotrisiloxane, 1,3,5-trivinyl-1,3,5-trimethylcyclotrisiloxane, 1,3,5-trimethyl-1,3,5-triphenylcyclotrisiloxane, 1,3,5-tris(3,3,3-trifluoropropyl)-1,3,5-trimethylcyclotrisiloxane, 1,3,5,7-tetramethylcyclotetrasiloxane, 1,3,5,7-tetraethylcyclotetrasiloxane, 1,3,5,7-tetravinylcyclotetrasiloxane, 1,3,5,7-tetraphenylcyclotetrasiloxane, octamethylcyclotetrasiloxane, octaethylcyclotetrasiloxane, octavinylcyclotetrasiloxane, octaphenylcyclotetrasiloxane, 1,3,5,7-tetravinyl-1,3,5,7-tetramethylcyclotetrasiloxane, 1,3,5,7-tetramethyl-1,3,5,7-tetraphenylcyclotetrasiloxane, 1,3,5,7-tetrakis(3,3,3-trifluoropropyl)-1,3,5,7-tetramethylcyclotetrasiloxane, 1,3,5,7,9-pentamethylcyclopentasiloxane, 1,3,5,7,9-pentaethylcyclopentasiloxane, 1,3,5,7,9-pentavinylcyclopentasiloxane, 1,3,5,7,9-pentaphenylcyclopentasiloxane, decamethylcyclopentasiloxane, decaphenylcyclopentasiloxane, 1,3,5,7,9-pentavinyl-1,3,5,7,9-pentamethylcyclopentasiloxane, 1,3,5,7,9-pentamethyl-1,3,5,7,9-pentaphenylcyclopentasiloxane, 1,3,5,7,9,11-hexamethylcyclohexasiloxane, 1,3,5,7,9,11-hexavinylcyclohexasiloxane, 1,3,5,7,9,11-hexaphenylcyclohexasiloxane, dodecamethylcyclohexasiloxane, dodecavinylcyclohexasiloxane and dodecaphenylcyclohexasiloxane or mixtures thereof.

5. The method according to claim 1, wherein the cyclic siloxane is selected from the group consisting of octaphenylcyclotetrasiloxane, decamethylcyclopentasiloxane and dodecamethylcyclohexasiloxane or a mixture thereof.

6. The method according to claim 1, wherein the at least one type of guest molecule is an uncharged organic guest molecule.

7. The method according to claim 6, wherein the uncharged organic guest molecule is a dye or an UV absorber.

8. The method according to claim 7, wherein the dye is a fluorescent dye.

9. The method according to claim 8, wherein the fluorescent dye is selected from the group consisting of perylene diimide dyes, terrylene diimide dyes and quaterrylene diimide dyes.

10. The method according to claim 1, wherein the temperature in step b) is between 150° C. and 350° C.

11. The method according to claim 10, wherein the temperature in step b) is between 200° C. and 250° C.

12. The method according to claim 1, wherein the composition in step b) is stirred for 1 to 5 hours.

13. The method according to claim 1, wherein the composition in step b) is heated under vacuum or in an inert gas.

14. The method according to claim 1, wherein the composition comprising the zeolite L host-guest material with the incorporated guest molecules is cooled and washed to remove guest molecules which are adsorbed on the outer surface of the zeolite L crystals.

15. The method according to claim 1, wherein the mixture of the at least one type guest molecule and the zeolite L crystals is obtained by
  i. dissolving the at least one type of guest molecule in a solvent,
  ii. mixing the zeolite L crystals and the solvent comprising the at least one type of guest molecule and
  iii. drying the mixture obtained in step ii) to receiving a dry, solvent- and oxygen-free mixture of the zeolite L crystals and the at least one type of guest molecule.

16. The method according to claim 15, wherein the mixture in step iii) is dried under vacuum.

* * * * *